United States Patent

[11] 3,625,957

| [72] | Inventors | Rodney Ian Fryer<br>North Caldwell;<br>Leo Henryk Sternbach, Upper Montclair, both of N.J. |
|---|---|---|
| [21] | Appl. No. | 700,348 |
| [22] | Filed | Jan. 25, 1968 |
| [45] | Patented | Dec. 7, 1971 |
| [73] | Assignee | Hoffmann-La Roche Inc.<br>Nutley, N.J.<br>Continuation-in-part of application Ser. No. 614,009, Feb. 6, 1967, now abandoned. This application Jan. 25, 1968, Ser. No. 700,348 |

[54] 4-ARYL (OR ALKYL) SULFONYL DERIVATIVES OF TETRAHYDRO-BENZODIAZEPINES
5 Claims, No Drawings

[52] U.S. Cl. .................................................. 260/239 BD, 260/239.3 D, 260/294.8 C, 424/244, 424/263
[51] Int. Cl. ...................................................... C07d 53/06, C07d 57/00
[50] Field of Search ............................................. 260/239 BD, 239.3 D, 295

[56] References Cited
UNITED STATES PATENTS

| 3,131,178 | 4/1964 | Archer et al. | 260/239 |
|---|---|---|---|
| 3,236,838 | 2/1966 | Archer et al. | 260/239 |
| 3,384,635 | 5/1968 | Carabateas | 260/239 |

OTHER REFERENCES
Ichii, Yakugaku Zasshi, Vol. 82, pages 999–1004 (1962)

*Primary Examiner*—Alton D. Rollins
*Attorneys*—Samuel L. Welt, Jon S. Saxe, William H. Epstein, Gerald S. Rosen, Bernard S. Leon, William O. Isgro and Jacob Frank ABSTRACT: Process for preparing dihydro-benzodiazepines from tetrahydro-benzodiazepines which involves forming novel 4-aryl or alkyl sulfonyl or alkanoyl derivatives of tetrahydro-benzodiazepines and with base, converting same to dihydro-benzodiazepines. Novel benzodiazepine-2-ones having an ethylenic linkage joining positions 3 and 4 are formed as intermediates.

Dihydro-benzodiazepines are useful as muscle relaxants, sedatives and anticonvulsants.

4-ARYL (OR ALKYL) SULFONYL DERIVATIVES OF TETRAHYDRO-BENZODIAZEPINES

RELATED CASES

This application is a continuation-in-part of U.S. Pat. application Ser. No. 614,009, and now abandoned, filed Feb. 6, 1967, in the name of Rodney Ian Fryer and Leo Henryk Sternbach. The benefit of this earlier-filed copending application is hereby claimed.

BRIEF SUMMARY OF THE INVENTION

The present invention relates to novel chemical processes and to novel intermediates useful in such chemical procedures. More particularly, the present invention relates to novel chemical processes for preparing known compounds useful as pharmacological agents by virtue of their pharmaceutical activity and to novel intermediates useful in such preparative techniques.

DETAILED DESCRIPTION

The present invention in detail relates to processes for preparing known compounds which can be characterized broadly in a chemical sense as being dihydro-5-aryl-1H-1,4-benzodiazepines and which are of the formula

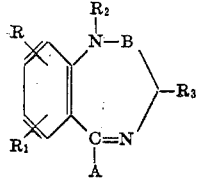

I wherein A is selected from the group consisting of phenyl, pyridyl and halophenyl; B is selected from the group consisting of carbonyl and methylene; R and $R_1$ are selected from the group consisting of halogen, preferentially, chlorine and bromine, nitro, trifluoromethyl and hydrogen; $R_2$ is selected from the group consisting of hydrogen, lower alkyl and lower alkenyl and $R_3$ is selected from the group consisting of hydrogen and lower alkyl.

By the term "halogen" as employed herein, all four forms thereof are intended, i.e., chlorine, bromine, fluorine and iodine, unless otherwise specified. By the term "lower alkyl" as utilized herein, either alone or in combination with another radical, straight or branched chain hydrocarbon groups containing 1-7, most preferably 1-4, carbon atoms in the chain are contemplated. Representative of lower alkyl groups are methyl, ethyl, isopropyl, tertiary butyl and the like. The term "aryl" as utilized herein is intended to connote, for example, a phenyl group, a substituted phenyl group, e.g., lower alkyl phenyl such as tolyl and the like. The term "lower alkanoyl" as used herein is intended to include the lower alkanoyl moieties of saturated fatty acids containing 1-7 carbon atoms, preferably 1-4 carbon atoms, such as acetyl, formyl and the like.

The said new and useful processes for preparing compounds of the formula I above in one aspect involves in its first stage, reacting a compound of the formula

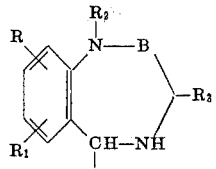

II wherein A, B, R, $R_1$, $R_2$ and $R_3$ are as above with a member selected from the group consisting of an aryl sulfonyl halide, a lower alkyl sulfonyl halide and a lower alkanoyl group providing agent. Representative of aryl sulfonyl halides suitable for the purposes of the present invention are tosyl halide, e.g., para-toluene-sulfonyl chloride and benzene sulfonyl halide, e.g., benzene-sulfonyl chloride. Suitable lower alkyl sulfonyl halides are illustrated by mesyl halide, e.g., methane sulfonyl chloride. Suitable lower alkanoyl group providing agents are illustrated by acetic anhydride, acetyl chloride and the like. Most advantageous for the purposes of this aspect of the present invention are aryl sulfonyl halides and lower alkyl sulfonyl halides. Especially preferred is tosyl chloride or mesyl chloride.

By proceeding in the manner described above, there results a compound of the formula

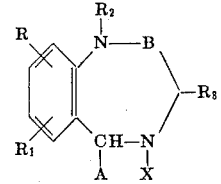

III wherein A, B, R, $R_1$, $R_2$ and $R_3$ are as above and X is selected from the group consisting of aryl sulfonyl, e.g., benzene sulfonyl, toluene sulfonyl and the like, alkyl sulfonyl, e.g., mesyl and the like, and lower alkanoyl, e.g., acetyl.

This process aspect is conveniently effected in the presence of an inert organic solvent such as an alkanol, e.g., ethanol and methanol, an ether such as diethyl ether and tetrahydrofuran, dimethylformamide, pyridine, a tertiary amine such as tertiary butyl amine or triethyl amine and the like. Suitably, an acid acceptor is provided to the reaction zone to accept the hydrochloric acid formed when utilizing a halide, e.g., an aryl sulfonyl halide or an alkyl sulfonyl halide, with a compound of the formula II above. Suitable acid acceptors are tertiary amines, pyridine and the like. In a preferred embodiment, the acid acceptor is provided in excessive amounts whereby it can serve a twofold purpose, i.e., both as the solvent medium in which the reaction is effected and as an acid acceptor. In a particular advantageous process variation, the reaction is effected in the presence of pyridine whereby the capability of pyridine to serve both as an acid acceptor and as a solvent medium is utilized.

Temperature and pressure are not critical aspects of the first stage of the process involving the conversion of the compound of the formula II above to the corresponding compound of the formula III. However, the reaction is most preferably effected at about room temperature and above.

Compounds of the formula III above wherein X is the lower alkanoyl group formyl, B is methylene, A is a phenyl group or a halophenyl group and $R_2$ is lower alkyl, i.e., 1-lower alkyl-1,2,3,5-tetrahydro-5-phenyl-1,4-benzodiazepine 4-carboxaldehydes of the formula

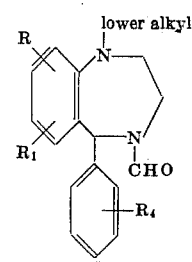

IIIa wherein R and $R_1$ are selected from the group consisting of halogen, preferentially, chlorine and bromine, nitro, trifluoromethyl and hydrogen and $R_4$ is selected from the group consisting of hydrogen and halogen, can also be prepared by treating a compound of the formula

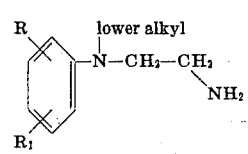

IV wherein R and R₁ are as above with a compound of the formula

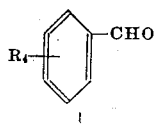

V wherein R₄ is as above
in the presence of formic acid whereby to obtain the corresponding compounds of the formula III above wherein R and R₁ are as above, X is the lower alkanoyl group formyl, B is methylene and A is phenyl or halophenyl, i.e., compounds of the formula IIIa above.

Reaction conditions are not critical when reacting a compound of the formula IV above with a compound of the formula V above whereby to obtain the corresponding compound of the formula IIIa above. Thus, the reaction can be effected at room temperature, at atmospheric pressure and/or above or below room temperature. However, preferentially, the reaction is conducted at elevated temperature, preferably in a temperature range of from about 20° to about 200° C. Suitably, an inert organic solvent can serve as the reaction medium. Among the many inert organic solvents suitable for this purpose may be included aromatic hydrocarbons such as toluene, xylene, halogenated aromatic hydrocarbons, e.g., chlorobenzene or any other suitable inert organic solvent. In a preferred aspect, however, the formic acid present when performing the reaction of a compound of the formula IV with a compound of the formula V is added in excess whereby it performs the dual function of serving both as a reaction participant and as the medium in which the reaction is effected. By this simple expedient, there is provided to the reaction zone, a substance necessary to a successful performance of the reaction, as well as the medium in which the reaction is conducted.

Compounds of the formula IV above are prepared by treating an N-lower alkyl substituted aniline of the formula

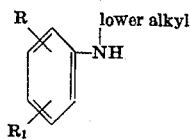

VI wherein R and R₁ are as above with ethyleneimine in the presence of an aprotic Lewis acid such as, for example, boron trifluoride, titanium tetrachloride, aluminum chloride and the like (preferentially, aluminum chloride) and an inert organic solvent, for example, a hydrocarbon such as benzene, toluene and the like, whereby to prepare a compound of the formula IV above.

While temperature and pressure are not critical aspects in the formation of a compound of the formula IV above thusly, elevated temperatures are preferred, e.g., preferably at about the reflux temperature of the reaction medium. The alternate method for preparing compounds of the formula IIIa above is not part of the present invention, but such is disclosed herein in order that the disclosure may be complete.

The second stage of the process of the present invention involves the conversion of a compound of the formula III above (and of course a compound of the formula IIIa above included within the genus represented thereby) into a compound of the formula I above. This reaction is effected in the presence of a base and an inert organic solvent. All that is required of the base is that it be suitable for the purposes of the present invention, that is, that it effect the conversion of a compound of the formula III above and a compound of the formula IIIa above to the corresponding compound of the formula I above. Among the many suitable bases can be included alkali metal lower alkylates such as sodium methoxide, potassium tertiary butoxide and the like and alkali metal hydrides, such as sodium hydride. Bases such as aqueous alkali metal hydroxides e.g. aqueous sodium hydroxide and aqueous potassium hydroxide and the like can also be efficaciously utilized for the purposes of the present invention when compounds of the formula III wherein X is benzene sulfonyl or alkyl sulfonyl are to be converted into the corresponding compounds of the formula I above. As is noted above, any suitable conveniently available inert organic solvent can be utilized in the conversion of the compounds of the formula III above to the corresponding compound of the formula I above. Representative, but by no means exclusively so, of inert organic solvents suitable for the purposes of the present invention are dimethylformamide, dimethylsulfoxide, tetrahydrofuran and the like. Here again, temperature and pressure are not critical aspects of this conversion step. However, it has been observed that temperatures of from about 0° to about 80°, most preferably, from about 25° to about 80° C., are advantageous since the highest yields of the desired end-product is obtained when the reaction is conducted within this preferred temperature range.

When preparing a compound of the formula I above wherein B represents a carbonyl group, by treating a corresponding compound of the formula III wherein B is carbonyl with a base, it has been observed that a compound of the formula

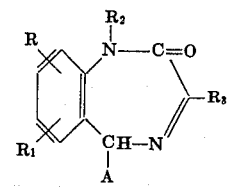

VII wherein A, R, R₁, R₂ and R₃ are as above results, as an intermediate. By treating this intermediate with a base, it can be converted into the corresponding compounds of the formula I above with or without isolating it from the reaction medium in which it is prepared.

Thus, a compound of the formula III above wherein B is carbonyl above can be treated with a base of the type identified fully above in an inert organic solvent of the character set forth and in the manner described above and the reaction interrupted when a compound of the formula VII above is obtained. Said compound of the formula VII can then be further reacted with a base preferentially present in a polar solvent such as water, a lower alkanol, e.g., ethanol and the like, which may be the same or different from the last-mentioned base of the type described above whereby a compound of the Formula I above wherein B is carbonyl is obtained. On the other hand, a compound of the formula III above wherein B is carbonyl can be treated with a base until the corresponding compound of the formula I above wherein B is carbonyl is obtained without interrupting the reaction or isolating an intermediate of the formula VII above. These variations are illustrated in the examples. The isolation of a compound of the formula VII above, if desired, is more readily effected if there is utilized an anhydrous medium as the reaction solvent.

In a preferred embodiment in all of the formulas illustrated above, R is hydrogen and R₁ is joined to the fused portion of the benzodiazepine nucleus at the 7-position thereof (or in the corresponding position of the compound illustrated). Furthermore, when A represents a pyridyl group, the pyridyl group is preferentially joined to the benzodiazepine nucleus at the 2-position thereof. Moreover, when A represents a halophenyl group, the halogen group is joined to the phenyl ring in the 2-position thereof and is preferentially fluorine. In the most preferred embodiment in all of the formulas above, R, R₃ and R₄ are all hydrogen, R₂ is selected from the group consisting of hydrogen and lower alkyl, most preferentially methyl, R₁ is halogen, most preferably, chlorine or bromine and is joined to the fused benzo ring of the benzodiazepine nucleus in the 7-position thereof and A is the unsubstituted phenyl group.

The foregoing is a description of a main synthetic route to the compounds of the formula I above. It will be readily apparent to those skilled in that art that variations in these preparative techniques are possible.

The following examples are illustrative but not limitative of the present invention. All temperatures therein are in degrees Centigrade.

EXAMPLE 1

A solution of 14.0 g. (0.051 m.) of 7-chloro-1-methyl-5-phenyl-2,3,4,5-tetrahydro-1H-1,4-benzodiazepine in 50 ml. of pyridine at reflux temperature, was treated with a solution of p-toluenesulfonyl chloride (11.7 g., 0.0615 m.) in 50 ml. of pyridine (addition time 20 min.) and was then heated under reflux for 1.5 hr. The hot reaction mixture was poured into 500 ml. of water and a black oil separated. The water was decanted and the oil was dissolved in 200 ml. of dichloromethane. The dichloromethane solution was washed with water (3×400 ml.), saturated brine solution (1×100 ml.), dried over anhydrous sodium sulfate, filtered, and evaporated to near dryness. Benzene was added and the solution was again evaporated to dryness to give a dark oil. The residual oil was dissolved in a small volume of benzene and filtered over a pad of florisil, which had been premoistened with hexane. A pale yellow solution was obtained on continued elution with benzene. The solution was evaporated to dryness to give an oil. Upon crystallization of the oil from an ether-hexane mixture 7-chloro-2,3,4,5-tetrahydro-1-methyl-5-phenyl-4(p-toluenesulfonyl)-1H-1,4-benzodiazepine was obtained as white crystals, m.p. 110°–117°. After recrystallization from a dichloromethane-hexane mixture, the product melted at m.p. 127°–130°.

EXAMPLE 2

A solution of 3.0 g. (0.007 m.) of 7-chloro-2,3,4,5-tetrahydro-1-methyl-5-phenyl-4(p-toluenesulfonyl)-1H-1,4-benzodiazepine in 35 ml. of dry N,N-dimethylformamide was treated with 0.3 g. (0.008 m.) of a 60 percent sodium hydride dispersion in mineral oil. The reaction mixture was stirred at room temperature for 2 hours and then allowed to stand for 48 hours. The reaction mixture was poured into 100 ml. of water and extracted with dichloromethane (2×75 ml.). The dichloromethane extracts were combined, washed with water (3×200 ml.), saturated brine solution (1×100 ml.), dried over anhydrous sodium sulfate, filtered and evaporated to dryness. The residual yellow oil was dissolved in 30 ml. of absolute ethanol and treated with 1.2 ml. of a 5.56 N solution of hydrogen chloride in ethanol. The ethanol was evaporated, and the residual oil was crystallized from a mixture of isopropanol and ether to give 7-chloro-2,3-dihydro-1-methyl-5-phenyl-1H-1,4-benzodiazepine hydrochloride as yellow prisms, m.p. 240°–250°.

EXAMPLE 3

A solution of 50.0 g. (0.184 m.) of 7-chloro-1,3,4,5-tetrahydro-5-phenyl-2H-1,4-benzodiazepin-2-one in 100 ml. of pyridine was heated to reflux. A warm solution of 42.0 g. (0.22 m.) of p-toluene-sulfonyl chloride in 100 ml. of pyridine was added to the reaction mixture over a 20 min. period. The reaction mixture was heated under reflux for 1.5 hrs. and was then poured into 1 l. of water. The mixture was stirred until a brown solid precipitated. The precipitate was collected by filtration and washed with four 500 ml. portions of water, two 300 ml. portions of ethanol, and 200 ml. of ether. The precipitate was then recrystallized from a mixture of chloroform and ethanol giving 7-chloro-1,3,4,5-tetrahydro-5-phenyl-4-(p-toluenesulfonyl)-2H-1,4-benzodiazepin-2-one as white prisms, m.p. 244°–250°. Recrystallization of the product from chloroform-ethanol gave the compound as white prisms, m.p. 246°–252°.

EXAMPLE 4

A solution of 10 g. (0.0234 m.) of 7-chloro-1,3,4,5-tetrahydro-5-phenyl-4-(p-toluenesulfonyl)-2H-1,4-benzodiazepin-2-one in 65 ml. of N,N-dimethylformamide was treated with a solution of sodium methoxide in methanol (0.028 m. of NaOCH$_3$) at room temperature. The resulting yellow solution was stirred for 20 min., cooled to 5° and next treated with 2.9 ml. of (0.047 m.) of methyl iodide. The resultant medium was stirred at 5°–10° for 10 min., and then at room temperature for 1.5 hr. The reaction mixture was poured into 200 ml. of water and extracted with 200 ml. of dichloromethane. The dichloromethane was washed with water (3×300 ml.), saturated brine solution, dried over anhydrous sodium sulfate and evaporated to dryness. The residual yellow oil which remained after evaporation was crystallized from dichloromethane-ether to give 7-chloro-1,3,4,5-tetrahydro-1-methyl-5-phenyl-4-(p-toluenesulfonyl)-2H-1,4-benzodiazepin-2-one as white needles, m.p. 260°–262°.

EXAMPLE 5

A solution of 4.0 g. (0.009 m.) of 7-chloro-1,3,4,5-tetrahydro-1-methyl-5-phenyl-4-(p-toluenesulfonyl)-2H-1,4-benzodiazepin-2-one in 35 ml. of N,N-dimethylformamide was treated with 0.4 g. (0.01 m.) of a 60 percent sodium hydride dispersion in mineral oil. The so-obtained reaction mixture was allowed to stand at room temperature for 55 hr., poured into 100 ml. of water which was then extracted with 100 ml. of dichloromethane. The dichloromethane extract was washed with water (3×100 ml.), saturated brine solution, dried over anhydrous sodium sulfate and evaporated to dryness. The residual oil was crystallized from an acetone-hexane mixture to give 7-chloro-1,3-dihydro-1-methyl-5-phenyl-2H-1,4-benzodiazepin-2-one as white prisms melting at 127°–130°.

EXAMPLE 6

A solution of 19.5 g. (0.0456 m.) of 7-chloro-1,3,4,5-tetrahydro-5-phenyl-4-(p-toluenesulfonyl)-2H-1,4-benzodiazepin-2-one in 150 ml. of dry benzene was treated with 4.0 g. (0.10 m.) of a 60 percent sodium hydride dispersion in mineral oil. The reaction mixture was heated under reflux for 20 hr., and was then poured into 300 ml. of water. Hydrochloric acid was added until approximately pH 7. The layers were separated and the aqueous phase was extracted with dichloromethane (2×1 l.). The organic layers were combined, washed with water (3×500 ml.), saturated brine solution (1×100 ml.), dried over anhydrous sodium sulfate, filtered and evaporated to dryness. The residual oil was crystallized from a mixture of dichloromethane-hexane to give 7-chloro-1,5-dihydro-5-phenyl-2H-1,4-benzodiazepin-2-one as white prisms, m.p. 202°–210°.

EXAMPLE 7

A solution of 0.5 g. (0.002 m.) of 7-chloro-1,5-dihydro-5-phenyl-2H-1,4-benzodiazepin-2-one in 15 ml. of N,N-dimethylformamide was treated with a solution of sodium methoxide in methanol (0.011 m. of NaOCH$_3$). The mixture was allowed to stand at room temperature for 0.5 hr. and then poured into 50 ml. of water. Hydrochloric acid was added until the pH reached approximately 7 and the mixture was extracted with dichloromethane (2×40 ml.). The combined dichloromethane extracts were washed with water (3×60 ml.), saturated brine solution (1×30 ml.), dried over anhydrous sodium sulfate, filtered, and evaporated to dryness. The residual oil was crystallized from a mixture of dichloromethane and hexane to give 7-chloro-1,3-dihydro-5-phenyl-2H-1,4-benzodiazepin-2-one as white prisms, m.p. 215°–221°.

EXAMPLE 8

A solution of 5.0 g. (0.0117 m.) of 7-chloro-1,3,4,5-tetrahydro-5-phenyl-4-(p-toluenesulfonyl)-2H-1,4-benzodiazepin-2-one in 35 ml. of N,N-dimethylformamide was treated with 1.0 g. (0.026 m.) of a 60 percent sodium hydride dispersion in mineral oil. The tan solution was stirred at room temperature for 1 hr. and then allowed to stand for 48 hrs. The reaction mixture was poured into 200 ml. of water and extracted with 100 ml. of dichloromethane. The dichloromethane extract was washed with water (3×500 ml.) saturated brine solution (1×100 ml.), dried over anhydrous sodium sulfate and evaporated to dryness to give an oil. The oil was dissolved in dichloromethane which was concentrated and cooled. The so-obtained concentrate was filtered and was recrystallized from acetone to give 7-chloro-1,3-dihydro-5-phenyl-2H-1,4-benzodiazepin-2-one as white prisms, m.p. 212°–214°.

EXAMPLE 9

A solution of 3.0 g. (0.007 m.) of 7-chloro-1,3,4,5-tetrahydro-5-phenyl-4-(p-toluenesulfonyl)-2H-1,4-benzodiazepin-2-one in 35 ml. of N,N-dimethylformamide was cooled to 5° C., and treated with a solution of sodium methoxide in methanol (0.0154 m. of $NaOCH_3$). The reaction mixture was allowed to stand for 79 hrs. The reaction mixture was poured into 200 ml. of water, hydrochloric acid was added until pH 7 and the solution was then extracted with 100 ml. of dichloromethane. The organic layer was separated and washed with water (3×300 ml.), saturated brine solution (1×100 ml.), dried over anhydrous sodium sulfate, filtered and evaporated to dryness. The residual oil was crystallized from a mixture of dichloromethane and hexane to give 7-chloro-1,3-dihydro-5-phenyl-2H-1,4-benzodiazepin-2-one as white prisms, m.p. 213°–217°.

EXAMPLE 10

A solution of 3.0 g. (0.007 m.) of 7-chloro-1,3,4,5-tetrahydro-5-phenyl-4-(p-toluenesulfonyl)-2H-1,4-benzodiazepin-2-one in 35 ml. of N,N-dimethylformamide was cooled to 5° C. and treated with 1.7 g. (0.0154 m.) of potassium tertiary butoxide. (The solution turned deep yellow.) The reaction mixture was stirred at 5° C. for one-half hour and then allowed to warm to room temperature and stand for 79 hrs. The reaction mixture was poured into 200 ml. of water, hydrochloric acid was added to pH 7 (approximately) and the solution was then extracted with 100 ml. of dichloromethane. The dichloromethane layer was separated and washed with water (4×300 ml.), saturated brine solution (1×100 ml.), dried over anhydrous sodium sulfate, filtered and evaporated to dryness. The residual oil was crystallized from a mixture of dichloromethane and hexane to give 7-chloro-1,3-dihydro-5-phenyl-2H-1,4-benzodiazepin-2-one as white prisms, m.p. 212°–216°.

EXAMPLE 11

A solution of 2.0 g. (0.0047 m.) of 7-chloro-1,3,4,5-tetrahydro-5-phenyl-4-(p-toluenesulfonyl)-2H-1,4-benzodiazepin-2-one in 30 ml. of N,N-dimethylformamide was treated with 0.5 ml. of 0.1 N sodium hydroxide solution. The mixture was stirred at room temperature for 4 hrs. and then allowed to stand for 55 hrs. The reaction mixture was poured into 100 ml. of water, hydrochloric acid was added to pH 7 and the solution was then extracted with dichloromethane (3×50 ml.). The combined dichloromethane extracts were washed with water (3×200 ml.), saturated brine solution (1×100 ml.), dried over anhydrous sodium sulfate, filtered and evaporated to dryness. The residual oil was crystallized from a mixture of dichloromethane and hexane. The product was then recrystallized two times from acetone to give 7-chloro-1,3-dihydro-5-phenyl-2H-1,4-benzodiazepin-2-one as white prisms, m.p. 211°–214°.

EXAMPLE 12

A solution of 5.0 g. (0.117 m.) of 7-chloro-1,3,4,5-tetrahydro-5-phenyl-4-(p-toluenesulfonyl)-2H-1,4-benzodiazepin-2-one in 40 ml. of tetrahydrofuran was treated with 1.0 g. (0.0258 m.) of a 60 percent dispersion of sodium hydride in mineral oil and the reaction mixture was stirred first at room temperature, and then at 60° for 5 hrs. The reaction mixture was poured into 200 ml. of water, and extracted into 100 ml. of dichloromethane. The dichloromethane extract was washed with water (3×300 ml.), saturated brine solution (1×100 ml.), dried over anhydrous sodium sulfate, filtered and evaporated to dryness. The residual oil was crystallized from dichloromethane to give 7-chloro-1,3-dihydro-5-phenyl-2H-1,4-benzodiazepin-2-one as white prisms, m.p. 210°–214°.

EXAMPLE 13

A solution of 5.0 g. (0.0117 m.) of 7-chloro-1,3,4,5-tetrahydro-5-phenyl-4-(p-toluenesulfonyl)-2H-1,4-benzodiazepin-2-one in 40 ml. of dimethylsulfoxide was treated with 1.0 g. (0.028 m.) of a 60 percent dispersion of sodium hydride in mineral oil. The reaction mixture was stirred at room temperature for an hour and was then allowed to stand for 40 hrs. (The solution turned amber.).

The reaction mixture was poured into 150 ml. of water and extracted with 100 ml. of dichloromethane. The dichloromethane extract was washed with water (3×300 ml.), saturated brine solution (1×100 ml.), dried over anhydrous sodium sulfate, filtered and evaporated to dryness. The residual oil was crystallized from a mixture of dichloromethane and hexane to give 7-chloro-1,3-dihydro-5-phenyl-2H-1,4-benzodiazepin-2-one as white prisms, m.p. 210°–214°.

EXAMPLE 14

A suspension of 50 g. (0.183 m.) of 7-chloro-1,3,4,5-tetrahydro-5-phenyl-2H-1,4-benzodiazepin-2-one in 380 ml. of pyridine was cooled to 5° and treated with 15.6 ml. (0.201 m.) of methanesulfonyl chloride (15 min.). The clear yellow solution was warmed to 28° and was then stirred at room temperature for 2.5 hrs. The reaction mixture was poured into 1.3 l. of water and stirred vigorously. The crystalline precipitate was collected by filtration and was washed with four 300 ml. portions of water followed by two 200 ml. portions of ether. Recrystallization of the product from a mixture of chloroform and ethanol gave 7-chloro-1,3,4,5-tetrahydro-4-methanesulfonyl-5-phenyl-2H-1,4-benzodiazepin-2-one as white prisms, m.p. 203°–206°.

EXAMPLE 15

A solution of 3.0 g. (0.0086 m.) of 7-chloro-1,3,4,5-tetrahydro-4-methanesulfonyl-5-phenyl-2H-1,4-benzodiazepin-2-one in 30 ml. of N,N-dimethylformamide was treated with 0.76 g. (0.019 m.) of a 60 percent sodium hydride dispersion in mineral oil. The reaction mixture was stirred at room temperature for 2 hrs. and then at 45° for 4 hrs. After cooling to room temperature, the reaction mixture was poured into 200 ml. of water, hydrochloric acid was added until pH 7 (approximately) and the resulting mixture was extracted with dichloromethane (2×75 ml.). The combined dichloromethane extracts were washed with water (3×300 ml.), saturated brine solution (1×100 ml.), dried over anhydrous sodium sulfate, filtered and evaporated to dryness. The residual oil was crystallized from a mixture of dichloromethane and hexane. The mother liquors were then evaporated to dryness and crystallized from a mixture of dichloromethane and hexane to give 7-chloro-1,3-dihydro-5-phenyl-2H-1,4-benzodiazepin-2-one as white prisms, m.p. 210°–214°.

EXAMPLE 16

A solution of 10.0 g. (0.034 m.) of 7-chloro-1,3,4,5-tetrahydro-5-(2-fluorophenyl)-2H-1,4-benzodiazepin-2-one in 100 ml. of pyridine was treated with a solution of 9.5 g. (0.051 m.) of p-toluenesulfonyl chloride in 50 ml. of pyridine. The reaction mixture was heated under reflux for 2 hrs. and poured into 750 ml. of water. After stirring for 0.5 hr. the oily precipitate crystallized. The crystals were collected by filtration, dissolved in a large volume of dichloromethane, which was dried over anhydrous sodium sulfate, filtered and then concentrated on a steambath to a small volume. The solution was cooled and 7-chloro-1,3,4,5-tetrahydro-5-(2-fluorophenyl)-4-(p-toluenesulfonyl)-2H-1,4-benzodiazepin-2-one was obtained by filtration. After recrystallization from a mixture of dichloromethane-petrol (b.p. 30°-60°), the product crystallized as white prisms, m.p. 242°-243°.

EXAMPLE 17

A solution of 3.0 g. (0.0068 m.) of 7-chloro-1,3,4,5-tetrahydro-5-(2-fluorophenyl)-4-(p-toluenesulfonyl)-2H-1,4-benzodiazepin-2-one in 35 ml. of N,N-dimethylformamide was treated with 0.6 g. (0.015 m.) of a 60 percent sodium hydride dispersion in mineral oil and was stirred at room temperature for 19 hrs. The reaction mixture was poured into 200 ml. of water and hydrochloric acid was added to approximately pH 7. The reaction mixture was then extracted with dichloromethane (2×75 ml.). The combined dichloromethane extracts were washed with water (4×600 ml.), saturated brine solution (1×100 ml.), dried over anhydrous sodium sulfate, filtered and evaporated to dryness. The residual yellow oil was crystallized from a mixture of dichloromethane and hexane. The mother liquors were evaporated to dryness and crystallized from a mixture of benzene and hexane to give 7-chloro-1,3-dihydro-5-(2-fluorophenyl)-2H-1,4-benzodiazepin-2-one as white prisms, m.p. 196°-202°.

EXAMPLE 18

To a solution of 7-chloro-1,2,3,5-tetrahydro-1-methyl-5-phenyl-4H-1,4-benzodiazepine-4-carboxaldehyde (1 gm., 3.3 mm.) in dry N,N-dimethylformamide (25 ml.) was added sodium hydride (300 mg. 7.5 mm. of 60 percent weight per weight suspension in mineral oil). The mixture was stirred under dry nitrogen for 90 hrs., and was then poured onto ice. After the ice had melted, the resulting precipitate was recovered, and slurried with 1N acetic acid solution. The mixture was filtered, and the filtrates were made basic with dilute sodium hydroxide solution, to give crude 7-chloro-2,3-dihydro-1-methyl-5-phenyl-1H-1,4-benzodiazepine as an oil, which was recovered by extraction with ether. Further purification was effected by filtration of a benzene solution of the extract through a bed of "Woelm" activity III neutral alumina (10 gm.). Evaporation of the filtrates afforded the product as a gum. Treatment of the gum with methanolic hydrogen chloride and ether yielded 7-chloro-2,3-dihydro-1-methyl-5-phenyl-1H-1,4-benzodiazepine hydrochloride. Recrystallization of the hydrochloride from methanol-ether gave orange crystals, m.p. 256°-257° C. (sealed tube) base (V).

The preparation of 7-chloro-1,2,3,5-tetrahydro-1-methyl-5-phenyl-4H-1,4-benzodiazepine-4-carboxaldehyde is not part of the present invention, but such preparation is disclosed herein in order that the disclosure be complete. Furthermore, the preparation of N-(p-chlorophenyl)-N-methylethylenediamine is not part of the present invention but is disclosed herein in order that the disclosure be complete.

Formic acid (100 ml., 98 percent weight per weight was carefully added to N-(p-chlorophenyl)-N-methylethylenediamine (70 gm., 0.4 mols), with stirring and while cooling in an ice bath. The so-formed reaction mixture was allowed to warm to 25° C., and was then treated with benzaldehyde (40 gm., 0.375 mols). The resultant mixture was then heated at 95° for 17 hours. After cooling, the mixture was added slowly to a stirred mixture of ice, 3N sodium hydroxide solution, and ether. The alkaline aqueous layer was separated, further extracted with ether (3×100 ml.) and discarded. The combined ether extracts were washed with water, dried (MgSO$_4$), and evaporated, to give an oil. The oil was dissolved in a mixture of N-hydrochloric acid (500 ml.) and ether (250 ml.). The ether layer was separated, and the aqueous acid layer was further extracted with ether (2×250 ml.). The combined ether extracts were washed with saturated sodium bicarbonate solution, dried (MgSO$_4$), and evaporated. Crystallization of the residue from isopropanol gave 7-chloro-1,2,3,5-tetrahydro-1-methyl-5-phenyl-4H-1,4-benzodiazepine-4-carboxaldehyde as two crops of crystals, m.p. 114°-115° and m.p. 120°-121°. Recrystallization of the combined crops from hexane afforded cream-colored prisms, m.p. 121°-122°.

A mixture of 63.8 g. (0.5 M) of p-chloroaniline and 114 g. (0.6 M) of p-toluenesulfonyl chloride in 400 ml. of pyridine was stirred at room temperature overnight. Most of the pyridine was then removed in vacuo. The residue was poured into 2 l. of ice water and the tosylate extracted with ether. The ether was extracted with 1N sodium hydroxide, aqueous hydrochloric acid, water, dried over magnesium sulfate and concentrated. The resulting oil was crystallized from ether, yielding tosylamido-4-chlorobenzene, m.p. 119.5°-120.5°.

A mixture of 70.4 g. (0.25 M) of tosylamido-4-chlorobenzene, 700 ml. toluene and 0.3 mole of sodium methoxide in 200 ml. of methanol was stirred and refluxed for 1 hour. After distilling off most of the methanol, 47.3 ml. (0.5 M) of dimethyl sulfate was added. The stirring and refluxing was then continued for 5 additional hours. The precipitated sodium salt disappeared slowly. Excess dimethyl sulfate was destroyed by refluxing an additional 1-½hours with 400 ml. of 3N sodium hydroxide. The phases were separated and the toluene distilled off leaving a white crystalline residue. Recrystallization from ethanol gave N-methyl-tosylamido-4-chlorobenzene, m.p. 92°-93°.

61.5 g. (0.208 M) of N-methyl-tosylamido-4-chlorobenzene were added to 580 ml. of sulfuric acid (spec. gravity 1.74) at 105°. The mixture was stirred, heated up to 145° and kept at that temperature for 1 hour. After cooling, the solution was made strongly alkaline with 50 percent sodium hydroxide and the organic base extracted with ether. The organic extract was dried over potassium hydroxide pellets, concentrated and the residue distilled in vacuo to yield p-chloro-N-methylaniline, b.p. 74°-75° at 0.7 mm. Hg.

To 13.3 g. of aluminum chloride and 20 ml. of dry benzene, in a 50 ml. three-neck flask equipped with reflux condenser, dropping funnel and stirrer, there was added 14.1 g. (0.1 M) of p-chloro-N-methylaniline, carefully and with cooling. After complete addition, the mixture was heated until reflux commenced and kept at that temperature for a short period. Freshly distilled ethyleneimine (4.3 g., 0.1 M) was then slowly distilled into the reaction vessel from a small flask attached to the former with a gas-inlet tube by heating the flask. After the addition was complete, the reaction mixture was stirred for another 30 minutes and then poured on 200 g. of ice contained in a 1-liter flask fitted with a condenser. Solid potassium hydroxide, 50 g., was added to the resulting solid in small portions, and the material was observed to go into solution. It was then cooled and extracted three times with benzene. The combined benzene extracts were dried over potassium hydroxide pellets and concentrated. The residue was distilled in vacuo through a 10-cm. Vigreux column yielding N-(p-chlorophenyl)-N-methyl-ethylenediamine, b.p. 126°-127° at 0.05 mm. Hg.

EXAMPLE 19

To a solution of 69 g. (0.25 moles) of crude 7-chloro-2,3,4,5-tetrahydro-1-methyl-5-phenyl-1H-1,4-benzodiazepine in 200 ml. of pyridine was added 125 ml. of acetic anhydride. The reaction mixture was left at room temperature for 15 minutes then heated on the steambath for 35 minutes and concentrated in vacuo to dryness. The residue was dissolved in a mixture of ether and ice-cold dilute hydrochloric acid. The ether layer was separated, washed with water and dilute ice-cold sodium hydroxide, then dried and concentrated in vacuo to dryness. The residue was crystallized from a mixture of ether and petroleum ether and gave 4-acetyl-7-chloro-2,3,4,5-tetrahydro-1-methyl-5-phenyl-1H-1,4-benzodiazepine melting at 106°–108°.

EXAMPLE 20

A solution of 1 g. (0.00318 M) of 4-acetyl-7-chloro-2,3,4,5-tetrahydro-1-methyl-5-phenyl-1H-1,4-benzodiazepine in 25 ml. of dry N,N-dimethylformamide under nitrogen was treated with 0.14 g. (0.00349 M) of 56.9 percent sodium hydride in mineral oil. The mixture was let stand for 60 hrs. It was then stirred at 40°–45° for 5 hrs. and solvents were removed under reduced pressure. The residue was dissolved in 50 ml. of ether and extracted with 1N hydrochloric acid (2×40 ml.). The acid layers were combined, made basic with ammonium hydroxide and extracted with 100 ml. of dichloromethane. The organic layer was washed with 50 ml. of a saturated brine solution, dried over anhydrous sodium sulfate and evaporated to dryness.

The resulting oil was dissolved in dichloromethane, filtered through 75 g. of silica gel, which was then eluted with 400 ml. of dichloromethane and 500 ml. of ethyl acetate. An excess of ethanolic hydrogen chloride was added to the ethyl acetate fraction, which was then evaporated to dryness. The product was recrystallized twice from isopropanol/ether to give 7-chloro-2,3-dihydro-1-methyl-5-phenyl-1H-1,4-benzodiazepine hydrochloride as orange prisms, m.p. 250°–254° (sealed tube).

We claim:

1. A compound selected from the group consisting of compounds of the formula

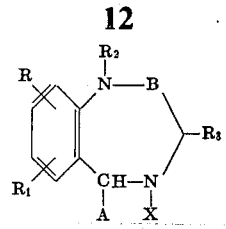

wherein A is selected from the group consisting of phenyl, pyridyl and halophenyl; B is selected from the group consisting of carbonyl and methylene; R and $R_1$ are selected from the group consisting of halogen, nitro, trifluoromethyl and hydrogen; $R_2$ is selected from the group consisting of hydrogen, lower alkyl and lower alkenyl; $R_3$ is selected from the group consisting of hydrogen and lower alkyl and X is selected from the group consisting of lower alkyl phenyl sulfonyl, phenyl sulfonyl and lower alkyl sulfonyl.

2. A compound as defined in claim 1 wherein R and $R_3$ are hydrogen and X is selected from the group consisting of tosyl and mesyl.

3. A compound as defined in claim 2 of the formula 7-halo-1,3,4,5-tetrahydro-1-lower alkyl-5-phenyl-4(p-toluenesulfonyl)-1H-1,4-benzodiazepine.

4. A compound as defined in claim 2 of the formula 7-halo-1,3,4,5-tetrahydro-5-phenyl-4(p-toluenesulfonyl)-2H-1,4-benzodiazepin-2-one.

5. A compound as defined in claim 4 of the formula 7-chloro-1,3,4,5-tetrahydro-5-phenyl-(p-toluenesulfonyl)-2H-1,4-benzodiazepin-2-one.

* * * * *